United States Patent [19] … [11] Patent Number: 4,521,793
Kabashima et al. … [45] Date of Patent: Jun. 4, 1985

[54] COLORING METHOD AND COLOR-FORMING MATERIAL

[75] Inventors: Kazuo Kabashima; Kyugo Tanaka, both of Yokohama, Japan

[73] Assignee: Asahi Kasei Kogyo Kabushiki Kaisha, Osaka, Japan

[21] Appl. No.: 513,969

[22] PCT Filed: Feb. 25, 1983

[86] PCT No.: PCT/JP83/00056

§ 371 Date: Jun. 30, 1983

§ 102(e) Date: Jun. 30, 1983

[87] PCT Pub. No.: WO83/02920

PCT Pub. Date: Sep. 1, 1983

[30] Foreign Application Priority Data

Feb. 27, 1982 [JP] Japan ................... 57-029797
Dec. 23, 1982 [JP] Japan ................... 57-224860
Dec. 24, 1982 [JP] Japan ................... 57-225937

[51] Int. Cl.$^3$ ............ B41M 5/16; B41M 5/18; B41M 5/22
[52] U.S. Cl. ................ 346/201; 346/216; 346/217; 346/218; 346/223; 346/224; 346/225; 346/226; 427/150; 427/151; 427/261
[58] Field of Search ........ 282/27.5; 427/150–152, 427/153, 261; 428/320.4–320.8, 411, 488, 537, 913, 914; 346/201, 216–218, 223–226

[56] References Cited

U.S. PATENT DOCUMENTS

| 4,011,352 | 3/1977 | Janssens et al. | 427/150 |
| 4,025,089 | 5/1977 | Garner et al. | 427/150 |
| 4,180,656 | 12/1979 | Garner | 106/288 Q |

FOREIGN PATENT DOCUMENTS

| 49-44807 | 4/1974 | Japan | 346/201 |
| 20809 | 3/1975 | Japan | 346/218 |
| 50-57452 | 5/1975 | Japan | 346/201 |
| 50-124719 | 10/1975 | Japan | 346/201 |
| 81629 | 7/1976 | Japan | 346/218 |
| 52-23406 | 8/1976 | Japan | 346/201 |
| 52-131550 | 4/1977 | Japan | 346/201 |
| 43899 | 12/1979 | Japan | 346/217 |

Primary Examiner—Bruce H. Hess
Attorney, Agent, or Firm—Finnegan, Henderson, Farabow, Garrett & Dunner

[57] ABSTRACT

Disclosed is a method for coloring an article to be colored, which comprises contacting and reacting, in the article to be colored, (a) at least one aromatically bonded isocyanate compound with (b) at least imino compound being capable of forming a color by the reaction with the isocyanate compound and having at least one $>C=NH$ group to effect the color formation, and a color-forming material comprising the compounds (a) and (b), at least one of which is supported on an article to be colored. A color or colored image formed by the reaction between the compounds (a) and (b) is excellent in chemical and light resistance.

31 Claims, No Drawings

COLORING METHOD AND COLOR-FORMING MATERIAL

BACKGROUND OF THE INVENTION

The present invention relates to a coloring method and a color-forming material. More particularly, the present invention relates to a coloring method and color-forming material providing a colored image or developed color image excellent in chemical and light resistance.

As a method for coloring papers, films, sheets, shaped articles, and other articles, there has ordinarily been adopted a method in printing, patterning or solid coloration is carried out by using colorants such as inks, dyes, pigments, and paints. As another coloring method, there is known a method in which a color-forming property is given in advance to an article to be colored and an energy or auxiliary substance necessary for the color formation is applied to the article from the outside to effect the color formation. With recent development of the information-oriented society, the latter method for effecting the color formation on an article to be colored has made rapid progress as a means for converting various information to visible images and recording them. For example, there are known a heat-sensitive color-forming method in which a chemically color-forming layer is formed on the surface of a support and the color formation and recording are effected with a heat energy, and a pressure-sensitive color-forming method in which the color formation and recording are effected with a pressure energy. These color-forming methods are not only applied in the field of the information industries but widely utilized for coloration and patterning of various daily necessities and industrial products.

As a typical instance of the color former for imparting a color-forming property to the surface of an article to be colored, there is known a two-component type color former comprising a leuco dye such as a phthalide, fluoran, or phenothiazine and an acidic substance. Since an excellent color-forming property is manifested by the color-forming method using such a leuco dye, this method is widely put into practical use in the fields of heat-sensitive recording and pressure-sensitive recording. However, most colored images obtained by this method, for example, colored images formed with the use of Crystal Violet Lactone, are defective in that the light resistance is poor and color fading is caused when the colored images are exposed to light for a relatively short time. Moreover, colored images obtained by the method using leuco dyes are poor in chemical resistance and the formed colors are readily extinguished by chemicals contained in foods, cosmetics, and plasticizers contained in vinyl chloride resins and rubber erasers.

SUMMARY OF THE INVENTION

It is therefore a primary object of the present invention to provide a coloring method and color-forming material which can provide a colored image or developed color image which is excellent in chemical and light resistance.

In accordance with one aspect of the present invention, there is provided a method for coloring an article to be colored, which comprises contacting and reacting, in the article to be colored, (a) at least one aromatically bonded isocyanate compound with (b) at least one imino compound being capable of forming a color by the reaction with said isocyanate compound and having at least one $>C=NH$ group to effect the color formation.

In accordance with another aspect of the present invention, there is provided a color-forming material for effecting the color formation by contacting and reacting (a) at least one aromatically bonded isocyanate compound with (b) at least one imino compound being capable of forming a color by the reaction with said isocyanate compound and having at least one $>C=NH$ group, wherein at least one of said compounds (a) and (b) is supported on an article to be colored.

DETAILED DESCRIPTION OF THE INVENTION

The present invention is based on the finding that the speed of the reaction of forming a carboxamide type azomethine linkage from (a) the above-mentioned aromatically bonded isocyanate compound (hereinafter referred to as "color former A") and (b) the above-mentioned imino compound (hereinafter referred to as "color former B") is very high and a color-forming product having an azomethine linkage, which is formed by said reaction, is excellent in chemical and light resistance.

The color formation mechanism according to the present invention has not completely been elucidated, but it is believed that the color formation is caused by the formation of an azomethine linkage $>C=N-$ by the reaction of the imino group $>C=NH$ of the imino compound specified in the present invention with the isocyanate group $-NCO$ of the isocyanate compound. It is considered that in order to obtain a sufficient color-forming property, it is necessary that chromophoric groups extend in a considerable length by conjugation with the azomethine linkage being as the center and, preferably that auxochromes be present at appropriate positions. More specifically, it is necessary that both the imino compound and isocyanate compound to be used in the present invention have aromatic compound residues or heterocyclic compound residues capable of forming a conjugated system with the azomethine linkage considered to be formed by the reaction of the two compounds. This fact will now be described with reference to the relation between the kind of the isocyanate compound and the color-forming property. Namely, 1,3-diiminoisoindoline was used as the imino compound, and this compound was reacted while being heating in dichlorobenzene as the solvent with several different isocyanate compounds independently and the color-forming states were observed. When m-phenylene diisocyanate, which is an aromatic isocyanate, was used, a yellow color-forming reaction product was obtained, but when m-xylylene diisocyanate having an isocyanate group bonded to a benzene ring through a methylene group was used, only a very light color product was obtained. When cyclohexyl diisocyanate or bis(isocyanatomethyl)cyclohexane, which is an alicyclic isocyanate, or hexamethylene diisocyanate, which is an aliphatic isocyanate, was used, the color formation did not occur at all.

In the present invention, the color formation can be attained very easily by the application of an energy such as heat or pressure or by supplying a solvent for the color former A and/or the color former B. Formation of various colors such as red, orange, yellow, brown, and black can optically be made by appropriately selecting the color former A and/or the color former B. The light resistance of the obtained colored article is excellent and can resist actions of chemicals. Therefore, according to the present invention, a novel coloring method capable of giving a colored article excellent in storage stability is provided. Furthermore, according to the present invention, a novel color-forming material which forms a color by application of an energy such as heat or pressure or an auxiliary substance such as a solvent and gives a colored article excellent in storage stability is provided. Moreover, the present invention provides a novel recording material for recording various information in the form of printed letters, figures, pictures, or the like.

The term "article to be colored" used in the present invention means solid articles composed of natural or synthetic organic and/or inorganic materials having various shapes, to which colored images are to be given, such as papers, films, plates, laminates, leathers, pipes, and molded articles. In case of the recording material, papers and films which are generally called "supports" because they support records thereon, are included in the article to be colored in the present invention.

The term "coloration" used in the present invention means the formation of an image of a certain color hue and a certain shape by the reaction between the color formers A and B, and the formation of letters, symbols, figures, and pictures in recording, and the transmission of information, formation of patterns and pictures for coloration and decoration of daily necessities and industrial products, and the formation of a variety of colored articles is included. Ordinarily, articles to be colored have a certain definite or indefinite shape, but coloration of the entire surface having no shape, that is, solid coloration, is included in the coloration referred to in the present invention.

An aromatically bonded isocyanate compound is used as the color former A in the present invention. Most of such aromatically bonded isocyanate compounds are represented by the following general formula (1):

R—(NCO)$_m$            (1)

wherein R stands for an aromatic compound residue or heterocyclic compound residue which may have a substituent, and m is an integer of at least 1.

Namely, the term "aromatically bonded isocyanate compound" used in the invention mean a compound containing at least one isocyanate group bonded directly to the benzene ring or conjugated system-forming heterocyclic ring of an aromatic compound having a benzene ring in the molecule such as benzene, naphthalene, or anthracene, or a heterocyclic compound having in the molecule a conjugated system-forming heterocyclic ring, such as pyridine, furan, or pyrrole.

Typical instances of the color former A are described below. Two or more of these compounds may be used in combination according to need.

Optionally used may be substituted phenyl isocyanates such as phenyl isocyanate, o-chlorophenyl isocyanate, 3,4-dichlorophenyl isocyanate, p-bromophenyl isocyanate, p-nitrophenyl isocyanate, o-methylphenyl isocyanate, p-methoxyphenyl isocyanate, 2,4,6-trichlorophenyl isocyanate, 2,6-dichloro-4-nitrophenyl isocyanate, 2-methyl-4-nitrophenyl isocyanate, 2,5-dimethoxy-4-nitrophenyl isocyanate, 4-nitro-2-bromo-6-cyanophenyl isocyanate, p-trifluoromethylphenyl isocyanate, 4-morpholino-2,5-dibutoxyphenyl isocyanate, and p-dimethylaminophenyl isocyanate; optionally substituted diphenyl monoisocyanates such as 4-N-phenylcarbamoylphenyl isocyanate, 4'-chloro-4-isocyanate diphenyl ether, diphenylsulfone-2-isocyanate, and p-isocyanatobenzene; optionally substituted phenylene diisocyanates such as p-phenylene diisocyanate, m-phenylene diisocyanate, 2,4-tolylene diisocyanate, 2,6-tolylene diisocyanate, 2,5-tolylene diisocyanate, 2-nitrobenzene-1,4-diisocyanate, chlorobenzene-3,5-diisocyanate, 2,5-dimethylbenzene-1,4-diisocyanate, 2-methoxybenzene-1,4-diisocyanate, 2,5-dimethoxybenzene-1,4-diisocyanate, 2,5-diethoxybenzene-1,4-diisocyanate, 2,5-dibutoxybenzene-1,4-diisocyanate, 2-chloro-5-methoxybenzene-1,4-diisocyanate, and 2-chloro-5-ethoxybenzene-1,4-diisocyanate; optionally substituted diphenyl diisocyanates such as 4,4'-diphenyl diisocyanate, 3,3'-dichloro-4,4'-diphenyl diisocyanate, 3,3'-dimethyl-4,4'-diphenyl diisocyanate, 3,3'-dimethoxy-4,4'-diphenyl diisocyanate, 3,3'-dinitro-4,4'-diphenyl diisocyanate, 3-nitro-4,4'-diphenyl diisocyanate, 3,3'-diethoxy-4,4'-diphenyl diisocyanate, 4,4'-diphenylmethane diisocyanate, 4,4'-diphenylether diisocyanate, diphenylsulfide-4,4'-diisocyanate, diphenylsulfone-4,4'-diisocyanate, 4,4'-diisocyanate-diphenylamine, 4,4'-benzophenone diisocyanate, 4,4'-azobenzene diisocyanate, 4,4'-stilbene diisocyanate, 3,3'-dimethyl-4,4'-diphenylmethane diisocyanate, 4,4'-dimethyl-3,3'-diisocyanatodiphenylurea, 2-methyl-4,4'-azobenzene diisocyanate, 2-methoxy-4,4'-azobenzene diisocyanate, 2,5-dimethyl-4,4'-azobenzene diisocyanate, 3-methyl-2'-methoxyazobenzene-4,4'-diisocyanate, 3-chloro-2'-methylazobenzene-4,4'-diisocyanate, 2-chloroazobenzene-4,3'-diisocyanate, 2-methylazobenzene-4,3'-diisocyanate, 2-methoxyazobenzene-4,3'-diisocyanate, 2,4-azobenzene diisocyanate, 5-methoxyazobenzene-2,4-diisocyanate, and 3,3',5,5'-tetramethyldiphenylmethane-4,4'-diisocyanate; and 2,8-dibenzothiophene diisocyanate, 3,7-dibenzofuran diisocyanate, 2,7-fluorene diisocyanate, 2,7-carbazole diisocyanate, dibenzothiophene-3,7-diisocyanate, 2,7-fluorene diisocyanate, 2,7-acrydine diisocyanate, 2,7-acrydone diisocyanate, 3,6-anthrone diisocyanate, 1,4-napthalene diisocyanate, 1,5-anthraquinone diisocyanate, 1,4-anthraquinone diisocyanate, 2,6-anthraquinone diisocyanate, 3,8-pyrene diisocyanate, 3,10-perylene diisocyanate, 2,8-diphenylene oxide diisocyanate, 5,8-quinoline diisocyanate, 2,8-chrysene diisocyanate, 4,7-benzimidazole diisocyanate, 2,6-pyridine diisocyanate, 2,5-pyridine diisocyanate, triphenylmethane triisocyanate, tris(4-phenylisocyanato)thiophosphate, and polymethylene polyphenyl isocyanate.

These isocyanates may be used in the form of adducts of phenols, lactams or oximes, or in the form of blocked isocyanates according to need. Furthermore, isocyanurate compounds which are trimers of diisocyanates, for example, an isocyanurate obtained from tolylene diisocyanate, may be used, and polyisocyanates, that is, isocyanate adducts of polyols, for example, an adduct of tolylene diisocyanate and trimethylol propane, may be used.

In the present invention, an imino compound being capable of forming a color by reaction with the color former A and having at least one >C=NH group is used as the color former B. Most of such imino compounds are represented by the following general formula:

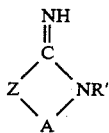

wherein A stands for C=O, C=NH, SO$_2$, C+OR$_1$)$_2$ (in which R$_1$ stands for a lower alkyl group),

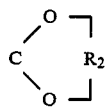

(in which R$_2$ stands for a lower alkylene group), C=NR$_3$ (in which R$_3$ stands for an aromatic compound or heterocyclic compound residue capable of forming a conjugated system together with the adjacent C=N) or

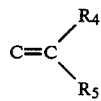

(in which R$_4$ and R$_5$ stand for an aromatic compound residue, heterocyclic compound residue, or another organic group capable of forming a conjugated system together with the adjacent C=C), R' stands for a hydrogen atom or a lower alkyl group, and Z stands for an aromatic compound residue or heterocyclic compound residue capable of forming a conjugated system together with C=NH.

As examples of the aromatic rings of Z, R$_3$, R$_4$, and R$_5$, there can be mentioned a benzene ring, a naphthalene ring, a biphenyl ring, an anthracene ring, an indene ring, a fluorene ring, a phenanthrene ring, an acenaphthene ring, and derivatives thereof, and as examples of the heterocyclic rings, there can be mentioned an indole ring, an indazole ring, a cumarone ring, a benzimidazolone ring, a benzothiophene ring, a benzoxazole ring, a benzothiazole ring, a benzimidazole ring, a pyridine ring, a quinoline ring, an isoquinoline ring, a quinazaline ring, an acrydine ring, a phenazine ring, a pyrazine ring, an oxazine ring, a xanthene ring, a purine ring, a dibenzofuran ring, a dibenzopyrrole ring, an anthraquinone ring, and derivatives thereof. As examples of the organic groups R$_4$ and R$_5$ capable of forming a conjugated system, there can be mentioned organic groups containing CO, CN, or SO$_2$, such as an acetyl group, an acetoxy group, a cyano group, a methoxycarbonyl group, an ethoxycarbonyl group, a methylcarbamoyl group, a phenylcarbamoyl group, a propionyl group, a propionyloxy group, a benzoyl group, a benzoyloxy group, and derivatives thereof. Furthermore, cyclic groups formed by R$_4$ and R$_5$, such as a barbituric acid group, a pyrazolidene group, and derivatives thereof, are included.

As specific examples of the color former B, there can be mentioned 3-iminoisoindolin-1-one, 3-imino-4,5,6,7-tetrachloroisoindolin-1-one, 3-imino-4,5,6,7-tetrabromoisoindolin-1-one, 3-imino-4,5,6,7-tetrafluoroisoindolin-1-one, 3-imino-5,6-dichloroisoindolin-1-one, 3-imino-4,5,7-trichloro-6-methoxyisoindolin-1-one, 3-imino-4,5,7-trichloro-6-methylmercaptoisoindolin-1-one, 3-imino-6-nitroisoindolin-1-one, 3-iminoisoindoline-1-spirodioxorane, 1,1-dimethoxy-3-iminoisoindoline, 1,1-diethoxy-3-imino-4,5,6,7-tetrachloroisoindoline, 1-ethoxy-3-iminoisoindoline, 1,3-diiminoisoindoline, 1,3-diimino-4,5,6,7-tetrachloroisoindoline, 1,3-diimino-6-methoxyisoindoline, 1,3-diimino-6-cyanoisoindoline, 1,3-diimino-4,7-dithia-5,5,6,6-tetrahydroisoindoline, 7-amino-2,3-dimethyl-5-oxopyrrolo[3,4b]pyrazine, 7-amino-2,3-diphenyl-5-oxopyrrolo[3,4b]pyrazine, 7-amino-5-imino-5H-pyrrolo[3,4b]pyrazine, 1-iminonaphthalic acid imide, 1-iminodiphenic acid imide, 1-phenylimino-3-iminoisoindoline, 1-(3'-chlorophenylimino)-3-iminoisoindoline, 1-(2',5'-dichlorophenylimino)-3-iminoisoindoline, 1-(2',4',5'-trichlorophenylimino)-3-iminoisoindoline, 1-(2'-cyano-4'-nitrophenylimino)-3-iminoisoindoline, 1-(2'-chloro-5'-cyanophenylimino)-3-iminoisoindoline, 1-(2',6'-dichloro-4'-nitrophenylimino)-3-iminoisoindoline, 1-(2',5'-dimethoxyphenylimino)-3-iminoisoindoline, 1-(2',5'-diethoxyphenylimino)-3-iminoisoindoline, 1-(2'-methyl-4'-nitrophenylimino)-3-iminoisoindoline, 1-(5'-chloro-2'-phenoxyphenylimino)-3-iminoisoindoline, 1-(4'-N,N-dimethylaminophenylimino)-3-iminoisoindoline, 1-(3'-N,N-dimethylamino-4'-methoxyphenylimino)-3-iminoisoindoline, 1-(2'-methoxy-5'-N-phenylcarbamoylphenylimino)-3-iminoisoindoline, 1-(2'-chloro-5'-trifluoromethylphenylimino)-3-iminoisoindoline, 1-(5',6'-dichlorobenzothiazolyl-2'-imino)-3-iminoisoindoline, 1-(6'-methylbenzothiazolyl-2'-imino)-3-iminoisoindoline, 1-(4'-phenylaminophenylimino)-3-iminoisoindoline, 1-(p-phenylazophenylimino)-3-iminoisoindoline, 1-(naphthyl-1'-imino)-3-iminoisoindoline, 1-(anthraquinone-1'-imino)-3-iminoisoindoline, 1-(5'-chloroanthraquinone-1'-imino)-3-iminoisoindoline, 1-(N-ethylcarbazoyl-3'-imino)-3-iminoisoindoline, 1-(naphthoquinone-1'-imino)-3-iminoisoindoline, 1-(pyridyl-4'-imino)-3-iminoisoindoline, 1-(benzimidazolone-6'-imino)-3-iminoisoindoline, 1-(1'-methylbenzimidazolone-6'-imino)-3-iminoisoindoline, 1-(7'-chlorobenzimidazolone-5'-imino)-3-iminoisoindoline, 1-(benzimidazolyl-2'-imino)-3-iminoisoindoline, 1-(benzimidazolyl-2'-imino)-3-imino-4,5,6,7-tetrachloroisoindoline, 1-(2',4'-dinitrophenylhydrazone)-3-iminoisoindoline, 1-(indazolyl-3'-imino)-3-iminoisoindoline, 1-(indazolyl-3'-imino)-3-imino-4,5,6,7-tetrabromoisoindoline, 1-(indazolyl-3'-imino)-3-imino-4,5,6,7-tetrafluoroisoindoline, 1-(benzimidazolyl-2'-imino)-3-imino-4,7-dithiatetrahydroisoindoline, 1-(4',5'-dicyanoimidazolyl-2'-imino)-3-imino-5,6-dimethyl-4,7-pyrazinoisoindoline, 1-(cyanobenzoylmethylene)-3-iminoisoindoline, 1-(cyanocarbonamidomethylene)-3-iminoisoindoline, 1-(cyanocarbomethoxymethylene)-3-iminoisoindoline, 1-(cyanocarboethoxymethylene)-3-iminoisoindoline, 1-(cyano-Nphenylcarbamoylmethylene)-3-iminoisoindoline, 1-[cyano-N-(3'-methylphenyl)-carbamoylmethylene]-3-iminoisoindoline, 1-[(cyano-N-(4'-chlorophenyl)-carbamoylmethylene]-3-iminoisoindoline, 1-[cyano-N-(4'-methoxyphenyl)-carbamoylmethylene]-3-iminoisoindoline, 1-[cyano-N-(3'-chloro-4'-methylphenyl)-carbamoylmethylene]-3-iminoisoindoline, 1-(cyano-p-nitrophenylmethylene)-3-iminoisoindoline, 1-(dicyanomethylene)-3-iminoisoindoline, 1-(cyano-1',2',4'-triazolyl-(3')-carbamoylmethylene)-3-iminoisoindoline, 1-(cyanothiazoyl-(2')-carbamoylmethylene)-3-iminoisoindoline, 1-(cyanobenzimidazolyl-(2')-carbamoylmethylene)-3-iminoisoindoline, 1-(cyanobenzothiazolyl-(2')-carbamoylmethylene)-3- iminoisoindoline, 1-[(cyanobenzimidazolyl-2')-methylene]-3-iminoisoindoline, 1-[(cyanobenzimidazolyl-2')-methylene]-3-imino-4,5,6,7-tetrachloro isoindoline, 1-[(cyanobenzimidazolyl-2')-methylene]-3-imino-5-methoxyisoindoline, 1-[(cyanobenzimidazolyl-2')methylene]-3-imino-6-chloroisoindoline, 1-[(1'-phenyl-3'-methyl-5'-oxo)-pyrazolidene-4']-3-iminoisoindoline, 1-[(cyanobenzimidazolyl-2')-methylene]-3-imino-4,7-dithiatetrahydroisoindoline, 1-[(cyanobenzimidazolyl-2')-methylene]-3-imino-5,6-dimethyl-4,7-pyrazinoisoindoline, 1-[(1'-methyl-3'-n-butyl)-barbituric acid-5']-3-iminoisoindoline, 3-imino-1-sulfobenzoic acid imide, 3-imino-1-sulfo-6-chlorobenzoic acid imide, 3-imino-1-sulfo-5,6-dichlorobenzoic acid imide, 3-imino-1-sulfo-4,5,6,7-tetrachlorobenzoic acid imide, 3-imino-1-sulfo-4,5,6,7-tetrafluorobenzoic acid imide, 3-imino-1-sulfo-6-nitrobenzoic acid imide, 3-imino-1-sulfo-6-methoxybenzoic acid imide, 3-imino-1-sulfo-4,5,7-trichloro-6-methylmercaptobenzoic acid imide, 3-imino-1-sulfonaphthoic acid imide, 3-imino-1-sulfo-5-bromonaphthoic acid imide, and 3-imino-2-methyl-4,5,6,7-tetrachloroisoindolin-1-one.

It is reported that among the compounds represented by the general formula (2), those having a structure represented by the following general formula (3) can take an isomeric structure (3') under some conditions [see P. E. Clark et al., J. Chem. Soc., 3593 (1953)]:

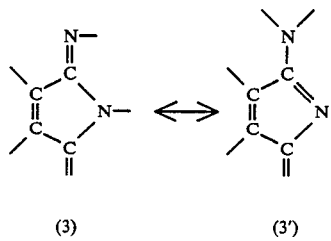

(3)          (3')

Accordingly, it is expected that a compound having a structure represented by the general formula (2) includes the following 3 isomers if A is OR:

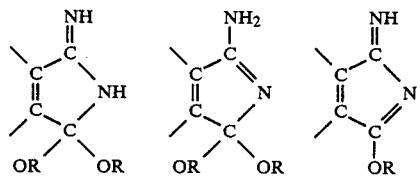

Accordingly, it sometimes happens that these compounds are expressed by different names. However, for the above-mentioned reason, all of these compounds and isomers are included within the scope defined by the general formula (2).

A mixture of two or more of the above-mentioned compounds may be used as the color former B in the present invention.

There are several methods for forming a color by the contact reaction of the color former A with the color former B in an article to be colored. One of important methods is a heat-sensitive color-forming method. According to this method, solid color formers A and B are supported on the article to be colored, a heat energy is applied to the article to fluidify at least one of the color formers and the contact reaction between both the color formers is thus caused to effect the color formation. In this method, an additive may be used so as to promote fluidification of the color formers. The heat energy is ordinarily given by a direct heating method using a heating element, a hot pen, a heating plate, a flame, or a heating furnace. There may be adopted a method in which a light energy or electric energy is applied and it is converted to heat energy in the article to be colored. As another color-forming method, there can be mentioned a pressure-sensitive color-forming method in which at least one of the color formers is dissolved in a non-volatile oil, the solution is emulsified and dispersed in an aqueous solution of a water-soluble polymeric substance, for example, an aqueous solution of gelatin and gum arabic, to encapsulate oil drops containing the color former dissolved therein by coacervation, the encapsulated oil drops are supported on the article to be colored and a pressure energy is applied to fluidify the encapsulated solution having the color former dissolved therein and the contact reaction is thus caused between both the color formers to effect the color formation. As still another method, there can be mentioned a method in which both the color formers A and B are supported on the article to be colored, a solvent capable of dissolving at least one of the color formers therein is applied to dissolve and fluidify the color former and both the color formers are thus contacted and reacted with each other to effect the color formation. As a still further method, there can be mentioned a method in which one of the color formers A and B is supported on the article to be colored, the other color former is applied in the form of a solution in an appropriate solvent and both the color formers are thus contacted and reacted with each other to effect the color formation.

The color former A and/or the color former B can be supported on the surface of the article to be colored according to various methods, and an appropriate method is selected according to the kind of article to be colored or the intended use or to whether the color formation is effected by heat energy or pressure energy. According to the most popular method, the color former A and/or the color former B is dispersed in a medium containing an appropriate binder, and the dispersion is coated and dried on the surface of the article to be colored. Known binders such as polyvinyl alcohol, modified starch, casein, gelatin, gum arabic, methyl cellulose, ethyl cellulose, hydroxyethyl cellulose, hydroxypropyl cellulose, carboxymethyl cellulose, a maleic anhydride-styrene copolymer, an isobutylene-maleic anhydride copolymer, a styrene-butadiene copolymer, an acrylic polymer, a vinyl toluene-acrylate copolymer, an olefin polymer, and a vinyl chloride polymer may be used. These binders can be used in the form of an aqueous solution, an emulsion or a solvent in an organic solvent. Furthermore, there may be adopted a method in which the color former, especially the color former B, is enmicrocapsulated with polystyrene or wax and is dispersed in a medium. As still another method, there can be mentioned a method in which the color former is dispersed in an appropriate thermoplastic resin and the resin is laminated on the surface of the article to be colored. Moreover, in case of an article formed by laminating a skin layer and a top layer on a substrate, such as an artificial leather, the color former A and/or the color former B may be dispersed in the skin layer and/or the top layer. This method may similarly be adopted in case of a laminated plate or other laminated article. In the case where the article to be colored is a film, a yarn, or a sheet, there may be adopted a method in which a starting molding material containing the color former incorporated therein is shaped into a film, a yarn, or the like.

Various additives may be added together with the color formers. The kinds of the additives to be used are changed according to the kind of article to be colored or the intended use or to whether the pressure-sensitive color-forming method or the heat-sensitive color-forming method is adopted. Typical instances of the additives will now be described.

One of the characteristic features of the present invention is that the reaction between the color formers A and B is advanced very easily. However, it sometimes happens that effecting the color formation at normal temperature or at a relatively low temperature or effecting the color formation at a high speed is desired. In this case, a reaction catalyst may be added. Known catalysts effective for the reaction between an isocyanate compound and an active hydrogen-containing compound, for example, tertiary amines such as triethylene diamine, organic metal salts such as dibutyl tin dilaurate, and carboxylic acid derivatives such as monomethyl phthalate, may be used. In the heat-sensitive color-forming method, color formers which are solid at normal temperature are often used, and a sensitivity improving agent is sometimes used so as to assist the fluidification of the color formers and advance the reaction effectively when the color formation is effected by heating. The sensitivity improving agent is a thermoplastic substance ordinarily having a melting point of about 40° C. to about 200° C., which preferably is compatible with at least one of the color formers or dissolves one of the color formers therein in the molten state. This additive facilitates the contact reaction between the color formers by lowering the melting points of the color formers or dissolving the color formers therein when the color formation is effected by heating. As examples of the additive of this type, there can be mentioned waxes such as paraffin wax and polyethylene wax, higher fatty acids and higher fatty acid esters, acid amides such as stearic acid amide, methylol amides, diphenyls such as 4,4'-dimethylbiphenyl, naphthalenes such as 1,3-dinitronaphthalene, ureas, acids such as phthalic anhydride, anilides acetoanilide, benzanilide and an alkyl carboxylic acid anilide, triphenyls, phthalonitriles, bisresorcinol-ethylene ether, salicilic acid derivatives such as 4-tert-butylphenyl salycilate, ethyl-2-cyano-3,3-diphenyl acrylate, benzophenone derivatives such as 2-hydroxy-4-methoxybenzophenone, benzotriazoles, fluorene, benzil, dimethyl isophthalate, diphenylsulfone, mandelic acid, benzoin, ethylanthraquinone, acetovanilone, cumarone compounds, acetoacetic anilide compounds, carbazoles such as N-ethylcarbazole, benzamides such as o-chlorobenzamide, sulfonamides, triphenylmethanes, acetamides such as stearyl acetamide, thiazoles such as dibenzothiazyl disulfide, sulfenamides such as N-cyclohexyl-2-benzothiazolyl sulfenamide, thiurams such as tetramethyl thiuram disulfide, dithioic acid salts such as zinc dibutyldithiocarbamate, guanidines such as diphenylguanidine, thioureas such as N,N-diphenylthiourea, phenyl hydrazide derivatives of carboxylic acids, phenols such as tetrakis-[methylene-3-(3',5'-di-tert-4'-hydroxyphenyl)propionate] and bisphenol A, p-hydroxybenzoic acid, its ester derivatives, and amides such as N,N-diphenylformamide. A pigment or filler such as talc, clay, silica, titanium oxide, or calcium carbonate may be used so as to improve the whiteness or the surface characteristics. Furthermore, various waxes, higher fatty acids, metal salts of higher fatty acids, and other higher fatty acid derivatives may be added so as to prevent unintended coloration (fogging).

The coloring method and color-forming material of the present invention can be applied to a variety of materials. The most important application resides in a recording material to be used for the recording and transmitting of information and in coloration of this recording material. The recording material of the present invention can be obtained according to the same method as the method for preparing a known recording material containing a leuco dye and an acidic substance except that the isocyanate compound and imino compound specified as the color formers in the present invention are used. For example, a heat-sensitive recording material can be prepared according to the method taught in U.S. Pat. No. 3,539,375. More specifically, the color formers are independently pulverized and dispersed in aqueous solutions or emulsions containing an appropriate binder by a ball mill, attritor or sand mill, and in some cases, a sensitivity improving agent, filler, or dispersant is simultaneously pulverized and dispersed. The so-formed dispersions of the color formers A and B are mixed together, and a binder, filler, sensitivity improving agent, pressure fogging-preventing agent, head matching property-improving agent, and the like are added to the mixture according to need to form a coating composition. The coating composition is coated on a support and dried to obtain a heat-sensitive recording material. As the binder, filler, sensitivity improving agent, and other additives used for the recording material, there can be used various known additive compounds for heat-sensitive recording materials, such as those exemplified hereinbefore. However, use of compounds which greatly inhibit the stability of the color formers used in the present invention or greatly inhibit the color-forming reaction should be avoided.

Furthermore, a pressure-sensitive recording material can be obtained according to methods such as those taught by U.S. Pat. No. 2,548,366 and U.S. Pat. No. 2,800,458. More specifically, oil drops containing, for example, the color former A dissolved therein are encapsulated by the above-mentioned coacervation, the dispersion containing the encapsulated oil drops is coated on the back surface of one support, a dispersion of the color former B is coated on the front surface of another support, and both the supports are piled so that the coated surfaces confront each other.

EXAMPLES

The present invention will now be described in detail with reference to the following examples that by no means limit the scope of the invention. In these examples, all of "parts" are by weight unless otherwise indicated.

EXAMPLE 1

Liquid A:
2,5-dimethoxybenzene-1,4-diisocyanate: 1 part
5% aqueous solution of polyvinyl alcohol: 2 parts
water: 2 parts The above-composition was pulverized in a ball mill for 24 hours, and 3 parts of a 20% aqueous solution of polyvinyl alcohol was added to the composition.

Liquid B:

1,3-diimino-4,5,6,7,-tetrachloroisoindoline: 1 part
5% aqueous solution of polyvinyl alcohol: 2 parts
water: 2 parts The above composition was pulverized in a ball mill for 24 hours, and 3 parts of a 20% aqueous solution of polyvinyl alcohol were added to the composition.

The liquids A and B were mixed at a ratio of ½ to form a coating composition. The coating composition was coated on wood-free paper having a basis weight of 50 g/m² by using a coating rod so that the amount of the coating after drying was about 3 g/m², and the coated paper was dried and smoothened by a super calender to obtain a heat-sensitive paper.

The so-obtained heat-sensitive paper was printed by Thermal Typer STT-401KC [heat-sensitive type printer supplied by Sanyo Denki K.K. [Sanyo Electric Co., Ltd.)]. Clear printed letter images having a reddish black color were obtained. Although dioctyl phthalate was dropped on the so-obtained colored images, they did not disappear even after the lapse of 1 month. The printed paper was exposed to light outdoors for 15 days so as to evaluate the light resistance of the colored images. No printed letters disappeared. For comparison, printed images were formed according to the known method using Crystal Violet Lactone (leuco dye) and bisphenol A. When dioctyl phthalate was dropped on the printed letter images, they immediately disappeared completely. When the printed paper was allowed to stand still outdoors for 15 days, the color faded to such an extent that the printed letters were substantially illegible.

EXAMPLE 2

Liquid A:
4,4'-diphenylmethane diisocyanate: 1 part
N,N-diphenyl formamide: 1 part
5% aqueous solution polyvinyl alcohol: 4 parts
water: 4 parts The above composition was pulverized in a ball mill for 2 hours.

Liquid B:
3-imino-4,5,6,7-tetrachloroisoindolin-1-one: 1 part
N,N-diphenyl formamide: 1 part
5% aqueous solution of polyvinyl alcohol: 4 parts
water: 4 parts The above composition was pulverized in a ball mill for 2 hours.

The liquids A and B and a 20% aqueous solution of polyvinyl alcohol were mixed at a ratio of 2/2/1 to form a coating composition. The coating composition was coated on a wood board so that the thickness of the coating after drying was about 5μ, and the coated board was then dried. A heating plate maintained at 160° C. was pressed on the coated surface of the wood board for 10 seconds (the pressure was 1 kg/cm²) to effect the color formation and obtain a yellow colored image. When ethanol was dropped on the colored portion, no substantial fading was observed.

EXAMPLE 3

Liquid A:
3,3'-dimethyl-4,4'-diphenyl diisocyanate: 1 part
N,N-diphenyl formamide: 1 part
5% aqueous solution of ethyl cellulose: 4 parts
water: 4 parts The above composition was pulverized in a ball mill for 2 hours.

Liquid B:
3-iminoisoindolin-1-one: 1 part
N,N-diphenyl formamide: 1 part
5% aqueous solution of ethyl cellulose: 4 parts
water: 4 parts The above composition was pulverized in a ball mill for 2 hours.

The liquids A and B and a methyl methacrylate/butyl acrylate copolymer emulsion (having a solid content of 45%) were mixed at a ratio of 4/4/1, and the obtained coating composition was coated on an artificial leather having a color very close to white so that the thickness of the coating after drying was about 5μ, and the coated leather as dried. When the coated leather was heated at 130° C. for 5 seconds, a colored image having a red-to-orange color was obtained.

EXAMPLE 4

Liquid A:
4,4'-benzophenone diisocyanate: 1 part
stearic acid amide: 1 part
5% aqueous solution of ethyl cellulose: 4 parts
water: 4 parts The above composition was pulverized in a ball mill for 2 hours.

Liquid B:
1,3-diiminoisoindoline: 1 part
stearic acid amide: 1 part
5% aqueous solution of ethyl cellulose: 4 parts
water: 4 parts The above composition was pulverized in a ball mill for 2 hours.

The liquids A and B and a methyl methacrylate/butyl acrylate copolymer emulsion (having a solid content of 45%) were mixed at a ratio of 4/4/1. The obtained coating composition was coated on an aluminum plate so that the thickness of the coating after drying was about 5μ, and the coated plate was dried. When the coated plate was heated, a reddish-yellow coloration was caused.

EXAMPLES 5 TO 49

Liquid A:
color former A shown in Table 1: 1 part
N,N-diphenyl formamide: 1 part
5% aqueous solution of polyvinyl alcohol: 4 parts
water: 4 parts The above composition was pulverized in a ball mill for 2 hours.

Liquid B:
color former B shown in Table 1: 1 part
N,N-diphenyl formamide: 1 part
5% aqueous solution of polyvinyl alcohol: 4 parts
water: 4 parts The above composition was pulverized in a ball mill for 2 hours.

The liquids A and B and a 20% aqueous solution of polyvinyl alcohol were mixed at a ratio of 2/2/1 to form a coating composition. The coating composition was coated on wood-free paper having a basis weight of 50 g/m² by a coating rod so that the amount of the coating after drying was about 9 g/m². The coated paper was dried to obtain a heat-sensitive recording paper. A heating plate maintained at 160° C. was pressed on the recording paper for 10 seconds (the pressure was 1 kg/cm²). The test was conducted on various combinations of color formers A and color formers B. The colors of the obtained colored images are shown in Table 1.

TABLE 1

| Example No. | Color Former A | Color Former B | Formed Color |
|---|---|---|---|
| 5 | 2,6-dichlorophenyl isocyanate | 1,3-diiminoisoindoline | greenish yellow |
| 6 | p-chlorophenyl isocyanate | " | yellow |
| 7 | p-phenylene diisocyanate | " | orange |
| 8 | o-phenylene diisocyanate | " | yellow |
| 9 | chlorobenzene-2,5-diisocyanate | " | light brown to orange |
| 10 | 2,5-dimethylbenzene-1,4-diisocyanate | " | orange |
| 11 | 2,5-dichlorobenzene-1,4-diisocyanate | " | yellow |
| 12 | 2,5-dimethoxybenzene-1,4-diisocyanate | " | reddish black |
| 13 | 2,5-diethoxybenzene-1,4-diisocyanate | " | reddish black |
| 14 | 3,3'-dichloro-4,4'-diphenyl diisocyanate | " | orange |
| 15 | 3,3'-dimethyl-4,4'-diphenyl diisocyanate | " | red |
| 16 | 3,3'-dimethoxy-4,4'-diphenyl diisocyanate | " | red |
| 17 | 3,3'-dinitro-4,4'-diphenyl diisocyanate | " | reddish yellow |
| 18 | 4,4'-diphenylmethane diisocyanate | " | greenish yellow |
| 19 | 3,3',6,6'-tetrachloro-4,4'-diphenyl diisocyanate | " | greenish yellow |
| 20 | 4,4'-benzophenone diisocyanate | " | reddish yellow |
| 21 | diphenylsulfone-4,4'-diisocyanate | " | yellow |
| 22 | 4,4'-benzoanilide diisocyanate | " | light brown |
| 23 | 4,4'-azobenzene diisocyanate | " | orange |
| 24 | 2,7-fluorene diisocyanate | " | light brown |
| 25 | 1,5-naphthalene diisocyanate | " | reddish yellow |
| 26 | p-phenylene diisocyanate | 1,3-diimino-4,5,6,7-tetrachloroisoindoline | light brown |
| 27 | 2,5-dimethoxybenzene-1,4-diisocyanate | 1,3-diimino-4,5,6,7-tetrachloroisoindoline | reddish black |
| 28 | 4,4'-benzanilide diisocyanate | 1,3-diimino-4,5,6,7-tetrachloroisoindoline | light brown |
| 29 | 1,5-naphthalene diisocyanate | 1,3-diimino-4,5,6,7-tetrachloroisoindoline | orange to brown |
| 30 | 2,7-fluorene diisocyanate | 1,3-diimino-4,5,6,7-tetrachloroisoindoline | brown |
| 31 | 3,3'-dimethyl-4,4'-diphenyl diisocyanate | 3-imino-isoindolin-1-one | red |
| 32 | 4,4'-diphenylmethane diisocyanate | " | yellow |
| 33 | " | 3-imino-4,7-dichloroisoindolin-1-one | yellow |
| 34 | 4,4-diphenylmethane diisocyanate | 3-imino-4,5,6,7-tetrachloroisoindlin-1-one | yellow |
| 35 | " | 3-imino-4,5,6,7-tetrafluoroisoindolin-1-one | yellow |
| 36 | tris(4-phenylisocyanato)thiophosphate | 1,3-diimino-4,5,6,7-tetra chloroisoindoline | yellow |
| 37 | 3,3'-dimethoxy-4,4'-diphenyl diisocyanate | 1,1-dimethoxy-3-imino-4,5,6,7-tetrachloroisoindoline | yellow |
| 38 | 2,7-fluorene diisocyanate | 1,1-dimethoxy-3-imino-4,5,6,7-tetrachloroisoindoline | light brown |
| 39 | 2,5-diethoxybenzene diisocyanate | 7-amino-2,3-dimethyl-5-oxopyrrolo 3,4b pyrazine | brown |
| 40 | 4,4'-diphenylmethane diisocyanate | 3-imino-1-sulfobenzoic acid imide | yellow |
| 41 | " | 1-(benzimidazolyl-2'-imino)-3-iminoisoindoline | yellow |
| 42 | " | 1-[cyanobenzimidazolyl-2')-methylene]-3-imino-4,5,6,7-tetrachloroisoindoline | orange |
| 43 | " | 1-iminonaphthalic acid imide | yellow |
| 44 | p-dimethylaminophenyl isocyanate | 1,3-diimino-4,5,6,7-tetrachloroisoindoline | reddish black |
| 45 | " | 3-imino-2-methyl-4,5,6,7-tetrachloroisoindoline-1-one | reddish black |
| 46 | 4,4'-diphenylmethane diisocyanate | 1-imino-diphenic acid imide | greenish yellow |
| 47 | triphenylmethane-4,4',4"-triisocyanate | 1,3-diimino-4,5,6,7-tetrachloroisoindoline | blue to violet |
| 48 | diphenyl ether-4,4'-diisocyanate | 1,3-diimino-4,5,6,7-tetrachloroisoindoline | yellow to orange |
| 49 | 1,5-anthraquinone diisocyanate | 1,3-diimino-4,5,6,7-tetrachloroisoindoline | black |

EXAMPLE 50

The amount of 25 g of 2,5-dimethylbenzene-1,4-diisocyanate was dispersed while strong stirring in 2 kg of a carbon tetrachloride solution containing 2.5% of paraffin wax to obtain a homogeneous dispersed solution. The solution was spray-dried by a spray drier to obtain 57 g of 2,5-dimethylbenzene-1,4-diisocyanate covered with paraffin wax. The ratio of the core to the cover was 1/2. Then, 3 parts of the so-obtained powder was mixed with 4 parts of a 5% aqueous solution of polyvinyl alcohol and 4 parts of water to obtain a liquid A. A colored image of an orange color was obtained on paper in the same manner as in examples 5 through 49 except that the so-obtained liquid was used as the liquid A and 1,1-dimethoxy-3-imino-4,5,6,7-tetrachloroisoindoline was used as the color former B of the liquid B.

EXAMPLE 51

One part of the powder of 2,5-dimethylbenzene-1,4-diisocyanate covered with paraffin wax, which was obtained in example 50, was mixed under agitation with a mixture having a composition described below to form a pasty mixture.

3-imino-4,5,6,7-tetrachloroisoindolin-1-one: 1 part
polymethyl acrylate: 2 parts
acetone: 7 parts The so-obtained liquid mixture was coated on a polyester film by an applicator and the coated film was dried to obtain a heat-sensitive color-forming material. When the color-forming material was heat-pressed at 100° C. for 10 seconds by a heating iron, the heated portion was colored in an orange color.

EXAMPLE 52

A heat-sensitive recording paper was prepared in the same manner as described in example 1 except that starch was used as the binder instead of polyvinyl alcohol. When this heat-sensitive recording paper was printed by Thermal Typer, reddish black printed letter images excellent in the chemical and light resistance were obtained.

EXAMPLE 53

A heat-sensitive recording paper was prepared in the same manner as described in example 29 except that stearin acid amide was used as the sensitivity improving agent instead of N,N-diphenyl formamide used in example 29. When the an orange-to-brown colored image excellent in chemical and light resistance was obtained.

EXAMPLE 54

Liquid A:
1,3-diimino-4,5,6,7-tetrachloroisoindoline: 1 part
N,N-diphenyl formamide: 1 part
15% aqueous solution of polyvinyl alcohol: 4 parts
water: 4 parts The above composition was pulverized in a ball mill for 2 hours.

Liquid B:
2,5-diethoxybenzene-1,4-diisocyanate: 1 part
N,N-diphenyl formamide: 1 part
15% aqueous solution of polyvinyl alcohol: 4 parts
water: 4 parts The above composition was pulverized in a ball mill for 2 hours.

The liquid A was coated on wood-free paper having a basis weight of 50 g/m$^2$ so that the amount of the coating after drying was about 4.5 g/m$^2$, and the coated paper was dried. Then, the liquid B was coated on the coated paper so that the amount of the coating after drying was about 4.5 g/m$^2$. When the so-obtained recording paper was pressed for 10 seconds by a heating plate maintained at 160° C. (the pressure was 1 kg/cm$^2$), the recording paper was colored in a reddish-black color.

EXAMPLE 55

The procedures of example 54 were repeated in the same manner except that the liquids A and B were coated on two wood-free papers, respectively, the two papers were piled so that the coated surfaces confronted each other and the heating plate was pressed on the back surface of the obtained heat-sensitive paper. An image of a reddish-black color was formed on the liquid A-coated surface.

EXAMPLE 56

Liquid A:
tolidine diisocyanate: 2 parts
vinyltoluene/acrylate copolymer: 1 part
stearic acid amide: 3 parts
ethylcyclohexane: 10 parts The above composition was pulverized and dispersed for 2 hours by a paint shaker filled with glass beads having a diameter of 2 mm.

Liquid B:
1,3-diimino-4,5,6,7-tetrachloroisoindoline: 2 parts
vinyltoluene/acrylate copolymer (PLIOLITE-VTAC supplied by Goodyear): 1 part
stearic acid amide: 3 parts
ethylcyclohexane: 6 parts The above composition was similarly pulverized and dispersed by using a paint shaker.

The liquids A and B were mixed at a ratio of 1/1, are the obtained coating composition was coated on wood-free paper having a basis weight of 50 g/m$^2$ by an applicator so that the thickness of the coating after drying was 10μ and the coated paper was dried. When the obtained recording paper was pressed for 5 seconds by a heating plate maintained at 120° C., an orange colored image was obtained.

EXAMPLE 57

The procedures of example 2 were repeated in the same manner except that a 0.05% trichlorobenzene solution of dibutyl tin dilaurate was dropped on a wood board on which 3-imino-4,5,6,7-tetrachloroisoindoline-1-one and 4,4'-diphenylmethane diisocyanate were supported as the color formers. The trichlorobenzene solution-dropped portions were colored in a yellow color.

EXAMPLE 58

In a ball mill, 1 part of 1,3-diimino-4,5,6,7-tetrachloroisoindoline, 2 parts of a 5% aqueous solution of polyvinyl alcohol, and 2 parts of water were pulverized for 24 hours, and 3 parts of a 20% aqueous solution of polyvinyl alchol was added to the formed liquid.

The so-obtained coating composition was coated on wood-free paper having a basis weight of 50 g/m$^2$ by a coating rod so that the amount of the coating after drying was about 2 g/m$^2$, and the coated paper was dried.

A solution comprising 4 parts of 2,6-anthraquinone diisocyanate, 0.004 part of dibutyl tin dilaurate and 96 parts of dichlorobenzene was dropped on the coated paper. The solution-dropped portions were colored in a brown color.

EXAMPLE 59

1,3-diimino-4,5,6,7-tetrachloroisoindoline: 1 part
styrene/butadiene block copolymer: 2 parts
toluene: 10 parts A mixture having the above composition was pulverized in a ball mill for 2 hours. The obtained coating composition was coated on art paper so that the amount of the coating after drying was about 5 g/m$^2$, and the coated paper was dried. A liquid formed by diluting a 75% ethyl acetate solution of a tolylene diisocyanatetrimethylol propane adduct (marketed under the tradename of "Coronate L") with an equal amount of ethyl acetate was dropped on the coated surface of the art paper. Then, the paper was dried and heated at 150° C. for 10 seconds. The isocyanate-dropped portions were colored in an orange color.

EXAMPLE 60

By a stirrer filled with glass beads, 4.3 parts of 3-imino-4,5,6,7-tetrachloroisoindolin-1-one and 100 parts of a polyurethane-methylethyl ketone solution having a solid concentration of 30% were dispersed for 30 minutes. Then, 5.7 parts of 3,3'-dimethyl-4,4'-diphenyl diisocyanate-methylethyl ketoxime blocked product were added to the dispersion, and the dispersing treatment was conducted again for 30 minutes to obtain a heat-sensitive color former-containing liquid mixture. The liquid mixture was coated and dried on a polyurethane leather to form a heat-sensitive color-forming material. When the color-forming material was heated at 200° C. for 5 seconds by a heating iron, the heated portion was colored in a reddish orange color.

EXAMPLE 61 AND COMPARATIVE EXAMPLES 1 TO 4

In a ball mill, 1 part of 1,3-diiminoisoindoline, 2 parts of a 5% aqueous solution of polyvinyl alcohol, and 2 parts of water were pulverized for 24 hours, and 3 parts of a 20% aqueous solution of polyvinyl alcohol was mixed with the dispersion. The obtained coating composition was coated on wood-free paper having a basis weight of 50 g/m² by a coating rod so that the amount of the coating after drying was about 2 g/m², and the coated paper was dried.

A solution comprising 4 parts of m-phenylene diisocyanate and 96 parts of dichlorobenzene was dropped on the so-obtained color-forming material, and the color-forming material was heated at 160° C. for 10 seconds.

For comparison, the reaction was carried out in the same manner as described in example 61 except that m-xylylene diisocyanate, 1,3-bis(isocyanatomethyl)cyclohexane, 1,3-cyclohexane diisocyanate, or hexamethylene diisocyanate was used instead of m-phenylene diisocyanate.

The obtained results are shown in Table 2.

TABLE 2

| | Isocyanate Used | Coloration |
|---|---|---|
| Example 61 |  NCO, NCO (benzene) | yellow |
| Comparative Example 1 | CH₂NCO, CH₂NCO (benzene) | very light yellow |
| Comparative Example 2 | CH₂NCO, CH₂NCO (cyclohexane) 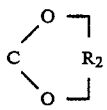 | no coloration |
| Comparative Example 3 | NCO, NCO (cyclohexane) 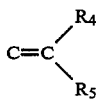 | no coloration |
| Comparative Example 4 | OCN(CH₂)₆NCO | no coloration |

In the example of the present invention, yellow coloration was caused, but in the comparative examples where an isocyanate compound free of an isocyanate group bonded directly to the benzene ring or heterocyclic ring, no substantial coloration was caused or even if a color was formed, the color was very light and the colored image had no practical value.

We claim:

1. A method for coloring an article to be colored, which comprises contacting and reacting, in the article to be colored, (a) at least one aromatically bonded isocyanate compound with (b) at least one imino compound being capable of forming a color by the reaction with said isocyanate compound and having at least one >C=NH group to effect the color formation, wherein at least one of said compounds (a) and (b) is supported on the article to be colored.

2. A method according to claim 1, wherein the isocyanate compound is a compound represented by the following general formula (1):

$$R\text{-}(NCO)_m \qquad (1)$$

wherein R stands for an aromatic compound residue or heterocyclic compound residue which may have a substituent, and m is an integer of at least 1, and the imino compound is a compound represented by the following general formula (2):

wherein A stands for C=O, C=NH, SO₂, C-(OR₁)₂ (in which R₁ stands for a lower alkyl group), $$C \diagdown_O^O \diagdown R_2$$

(in which R₂ stands for a lower alkylene group), C=NR₃ (in which R₃ stands for an aromatic compound or heterocyclic compound residue capable of forming a conjugated system together with the adjacent C=N) or $$C=C \diagup_{R_5}^{R_4}$$

(in which R₄ and R₅ stand for an aromatic compound residue, heterocyclic compound residue, or another organic group capable of forming a conjugated system together with the adjacent C=C), R' stands for a hydrogen atom or a lower alkyl group, and Z stands for an aromatic compound residue or heterocyclic compound residue capable of forming a conjugated system together with C=NH.

3. A method according to claim 2, wherein R in the general formula (1) stands for a benzene ring, naphthalene ring, naphthoquinone ring, anthraquinone ring, fluorene ring, diphenyl ring, diphenylmethane ring, triphenylmethane ring, trisphenyl thiophosphate ring, benzophenone ring, diphenyl ether ring, diphenyl sulfide ring, diphenyl sulfone ring, azobenzene ring, benzanilide ring, or triphenyl cyanurate ring which may have a substituent.

4. A method according to claim 2, wherein the compound represented by the general formula (1) is a 2,5-dialkoxybenzene-1,4-diisocyanate.

5. A method according to claim 2, wherein Z in the general formula (2) is a benzene ring which may have a substituent.

6. A method according to claim 2, wherein Z in the general formula (2) is a naphthalene ring which may have a substituent.

7. A method according to claim 2, wherein Z in the general formula (2) is a diphenyl ring which may have a substituent.

8. A method according to claim 2, wherein Z in the general formula (2) is a pyrazine ring which may have a substituent.

9. A method according to claim 2, wherein the compound represented by the general formula (2) is 3-iminoisoindolin-1-one which may have a halogen substituent.

10. A method according to claim 2, wherein the compound represented by the general formula (2) is 1,3-diiminoisoindoline which may have a halogen substituent.

11. A method according to claim 1, wherein the isocyanate compound is a blocked isocyanate compound blocked with a blocking agent having an active hydrogen atom.

12. A method according to claim 1, wherein one of the compound (a) and compound (b) is supported on the article to be coated and one of the compound (a) and compound (b) is fluidified in the form of a solution to effect the contact reaction between both the compounds.

13. A heat-sensitive coloration method which comprises contacting and reacting under heating, in an article to be colored, (a) at least one aromatically bonded isocyanate compound with (b) at least one imino compound being capable of forming a color by the reaction with said isocyanate compound and having at least one >C=NH group to form a colored image, wherein at least one of said compounds (a) and (b) is supported on the article to be colored.

14. A method according to claim 13, wherein the isocyanate compound is a compound represented by the following general formula (1):

R—(NCO)$_m$  (1)

wherein R stands for an aromatic compound residue or heterocyclic compound residue which may have a substituent, and m is an integer of at least 1,
and the imino compound is a compound represented by the following general formula (2):

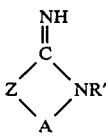  (2)

wherein A stands for C=O, C=NH, SO$_2$, C—(OR$_1$)$_2$ (in which R$_1$ stands for a lower alkyl group),

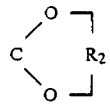

(in which R$_2$ stands for a lower alkylene group), C=NR$_3$ (in which R$_3$ stands for aromatic compound or heterocyclic compound residue capable of forming a conjugated system together with the adjacent C=N) or

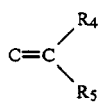

(in which R$_4$ and R$_5$ stand for an aromatic compound residue, heterocyclic compound residue, or another organic group capable of forming a conjugated system together with the adjacent C=C), R' stands for a hydrogen atom or a lower alkyl group, and Z stands for an aromatic compound residue or heterocyclic compound residue capable of forming a conjugated system together with C=NH.

15. A method according to claim 14, wherein R in the general formula (1) stands for a benzene ring, naphthalene ring, naphthoquinone ring, anthraquinone ring, fluorene ring, diphenyl ring, diphenylmethane ring, triphenylmethane ring, trisphenyl thiophosphate ring, benzophenone ring, diphenyl ether ring, diphenyl sulfide ring, diphenyl sulfone ring, azobenzene ring, benzanilide ring, or triphenyl cyanurate ring which may have a substituent.

16. A method according to claim 14, wherein the compound represented by the general formula (1) is a 2,5-dialkoxybenzene-1,4-diisocyanate.

17. A method according to claim 14, wherein Z in the general formula (2) is a benzene ring which may have a substituent.

18. A method according to claim 14, wherein Z in the general formula (2) is a naphthalene ring which may have a substituent.

19. A method according to claim 14, wherein Z in the general formula (2) is a diphenyl ring which may have a substituent.

20. A method according to claim 14, wherein Z in the general formula (2) is a pyrazine ring which may have a substituent.

21. A method according to claim 14, wherein the compound represented by the general formula (2) is 3-iminoisoindolin-1-one which may have a halogen substituent.

22. A method according to claim 14, wherein the compound represented by the general formula (2) is 1,3-diiminoisoindoline which may have a halogen substituent.

23. A method according to claim 13, wherein the isocyanate compound is a blocked isocyanate blocked with a blocking agent having an active hydrogen atom.

24. A method according to claim 13, wherein the colored image is a recorded image.

25. A method according to claim 13, wherein the article to be colored is a paper.

26. A color-forming material for effecting the color formation by contacting and reacting (a) at least one aromatically bonded isocyanate compound with (b) at least one imino compound being capable of forming a color by the reaction with said isocyanate compound and having at least one C=NH group, wherein at least one of said compounds (a) and (b) is supported on an article to be colored.

27. A color-forming material as set forth in claim 26, wherein the isocyanate compound is a compound represented by the following general formula (1):

 (1)

wherein R stands for an aromatic compound residue or heterocyclic compound residue which may have a substituent, and m is an integer of at least 1,
and the imino compound is a compound represented by the following general formula (2):

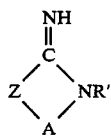 (2)

wherein A stands for C=O, C=NH, SO$_2$, C+OR$_1$)$_2$ (in which R$_1$ stands for a lower alkylene group),

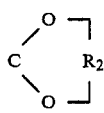

(in which R$_2$ stands for a lower alkylene group), C=NR$_3$ (in which R$_3$ stands for an aromatic compound or heterocyclic compound residue capable of forming a conjugated system together with the adjacent C=N) or

(in which R$_4$ and R$_5$ stand for an aromatic compound residue, heterocyclic compound residue, or another organic group capable of forming a conjugated system together with the adjacent C=C), R' stands for a hydrogen atom or a lower alkyl group, and Z stands for an aromatic compound residue or heterocyclic compound residue capable of forming a conjugated system together with C=NH.

28. A color-forming material as set forth in claim 26, which is a recording material for use in recording or reproduction.

29. A color-forming material as set forth in claim 26, which is a heat-sensitive recording material.

30. A color-forming material as set forth in claim 26, wherein the article to be colored is a paper.

31. A color-forming material as set forth in claim 26, wherein at least one of the compounds (a) and (b) is supported on the article to be colored by using a water-soluble polymer and/or a water-dispersible polymer as a binder.

* * * * *